United States Patent
Klode

(10) Patent No.: US 6,559,571 B1
(45) Date of Patent: May 6, 2003

(54) PROGRAMMABLE BRUSH FOR DC MOTORS

(75) Inventor: Harald Klode, Centerville, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 1092 days.

(21) Appl. No.: 08/964,780

(22) Filed: Nov. 5, 1997

Related U.S. Application Data

(63) Continuation-in-part of application No. 08/598,379, filed on Feb. 8, 1996, now abandoned.

(51) Int. Cl.⁷ .................. H02K 13/00; H02K 13/10
(52) U.S. Cl. ........................... 310/241; 310/248
(58) Field of Search ................ 310/248, 251, 310/241, 238, 239

(56) References Cited

U.S. PATENT DOCUMENTS

| | | | | |
|---|---|---|---|---|
| 2,206,366 A | * | 7/1940 | Redmond | 310/248 |
| 4,546,293 A | | 10/1985 | Peterson et al. | 318/254 |
| 4,651,068 A | | 3/1987 | Meshkat-Razavi | 318/254 |
| 4,739,240 A | | 4/1988 | MacMinn et al. | 318/696 |
| 4,835,448 A | | 5/1989 | Dishner et al. | 318/254 |
| 5,446,324 A | * | 8/1995 | Onodera | 310/45 |
| 5,485,049 A | * | 1/1996 | Shannon et al. | 310/248 |
| 5,852,352 A | * | 12/1998 | Suriano | 318/541 |

FOREIGN PATENT DOCUMENTS

| | | | | |
|---|---|---|---|---|
| DE | 2403432 | | 7/1975 | 310/254 |
| DE | 3819062 | | 12/1989 | 310/254 |
| GB | 813649 | * | 5/1959 | 310/248 |
| JP | 3-71582 | * | 3/1991 | 310/248 |
| JP | 6-225500 | * | 8/1994 | 310/251 |

* cited by examiner

*Primary Examiner*—Karl Tamai
(74) *Attorney, Agent, or Firm*—Jacox, Meckstroth & Jenkins

(57) ABSTRACT

The invention concerns a brush system for a commutated DC motor. As the brush wears, different cross-sectional shapes, at different positions, come into contact with the commutator. The center of contact for each cross-sectional shape can be different, thereby changing brush angle as wear occurs. The change in brush angle can be desirable, in order to offset other effects which occur as a result of wear. For example, motor speed can change as a result of brush wear. Changing brush angle can offset the change in speed.

7 Claims, 13 Drawing Sheets

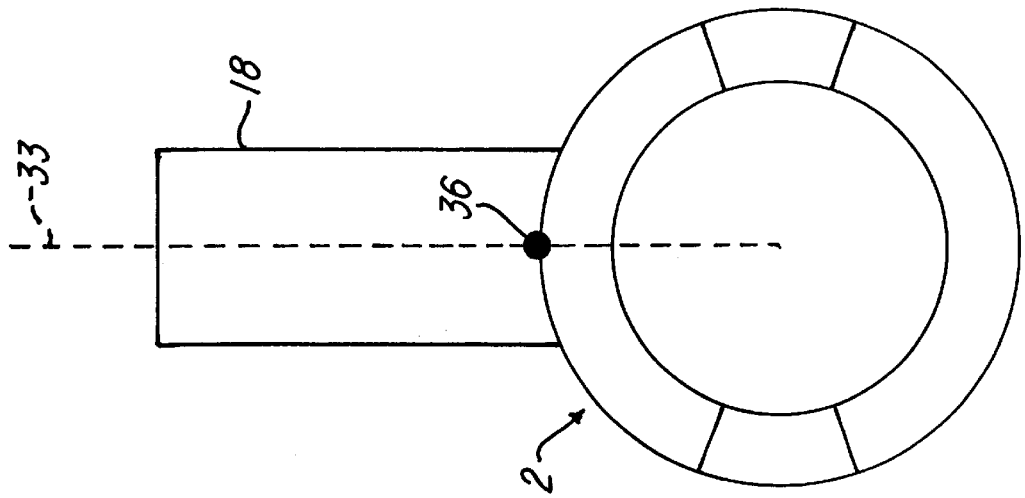
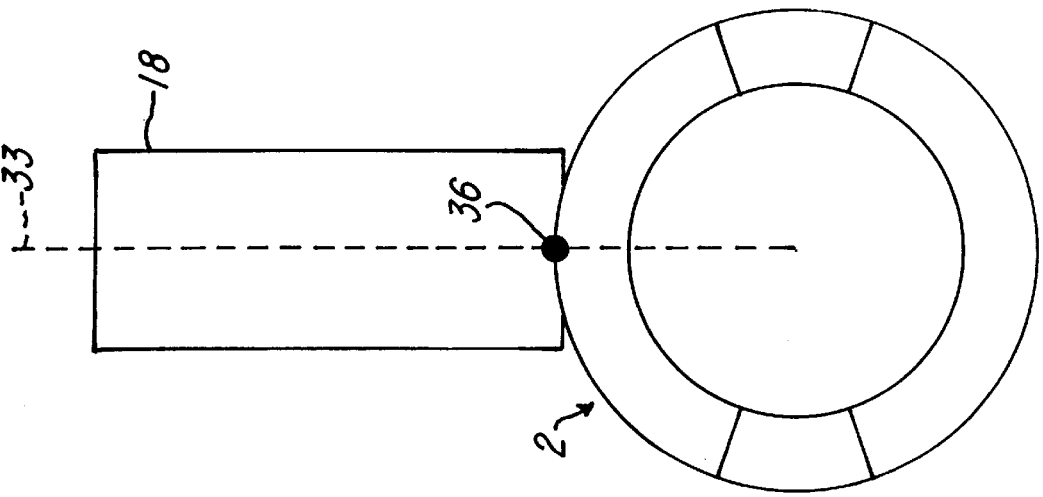
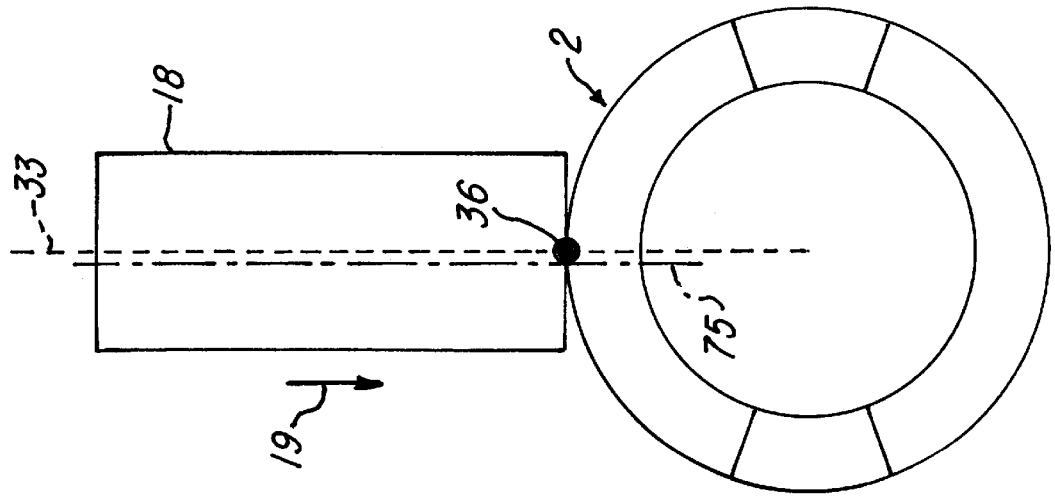

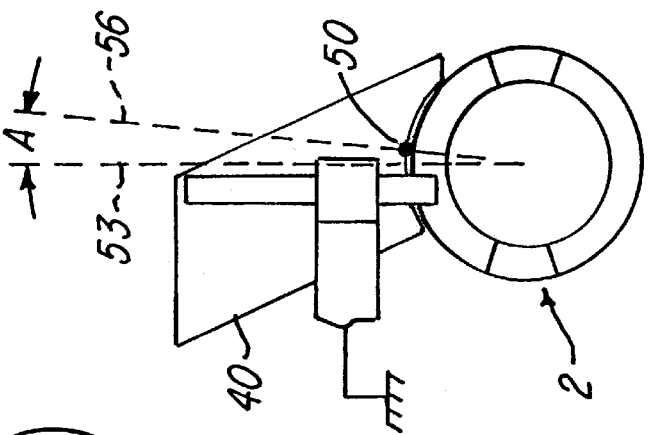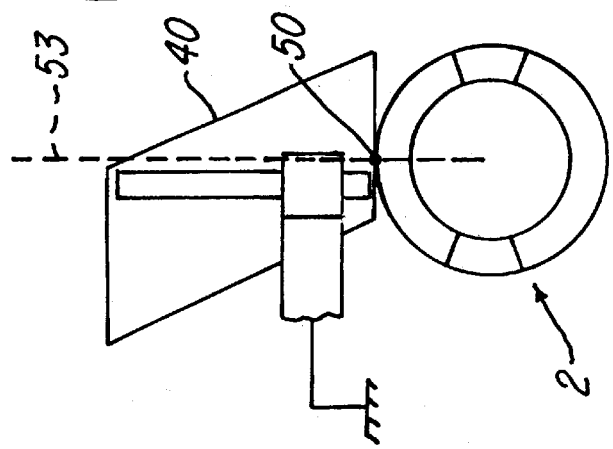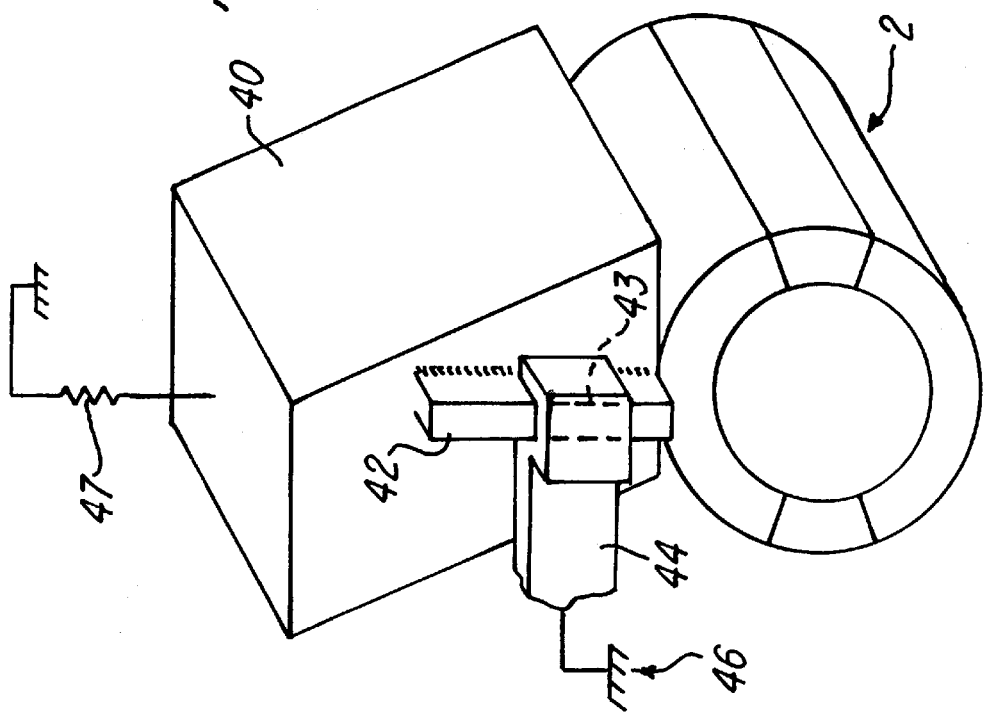

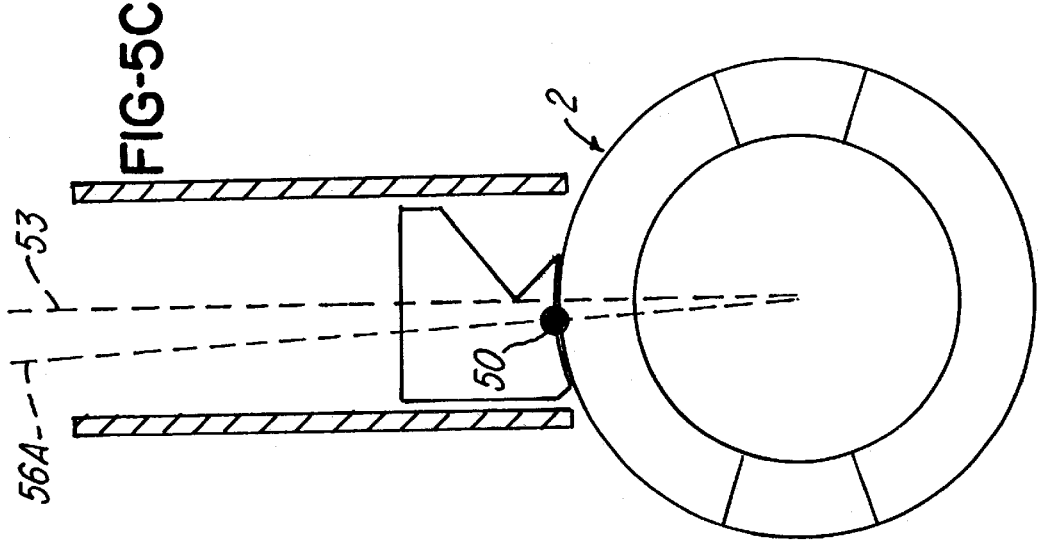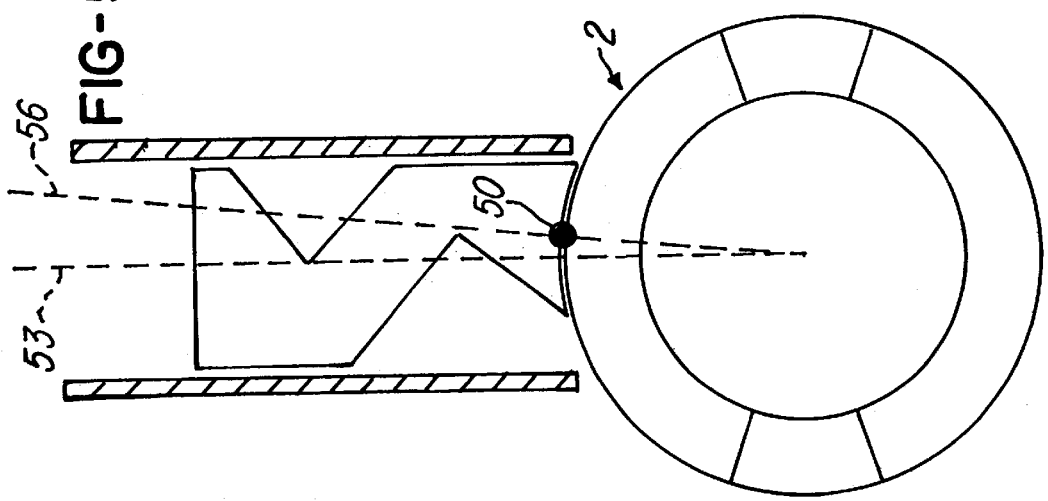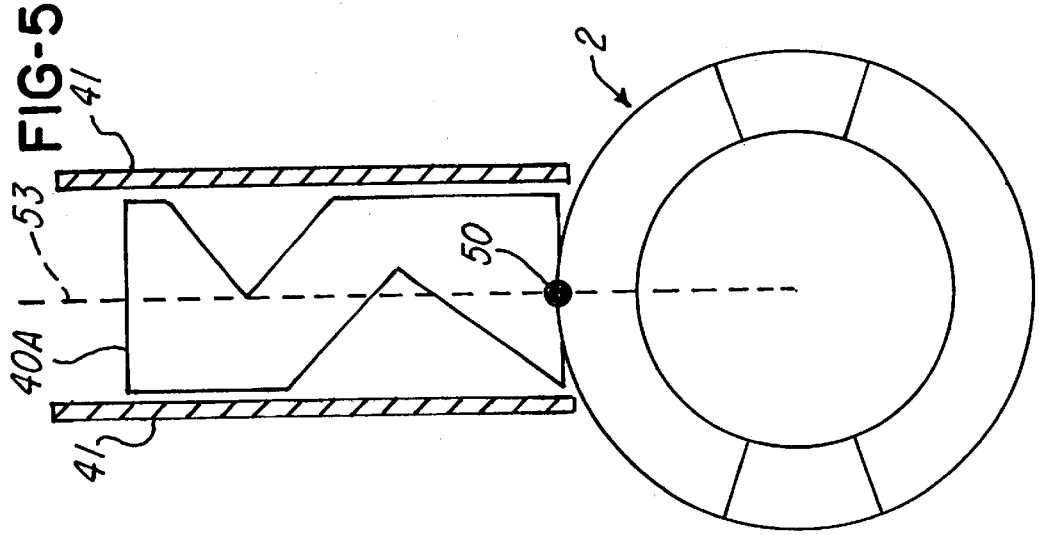

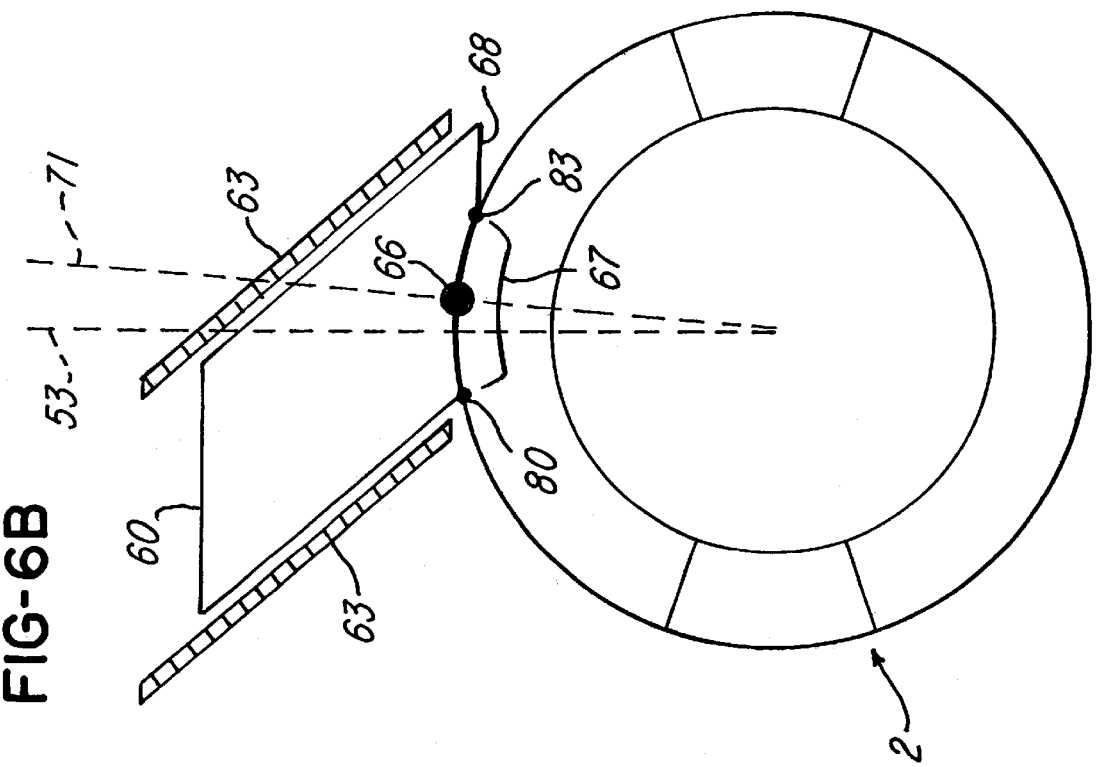
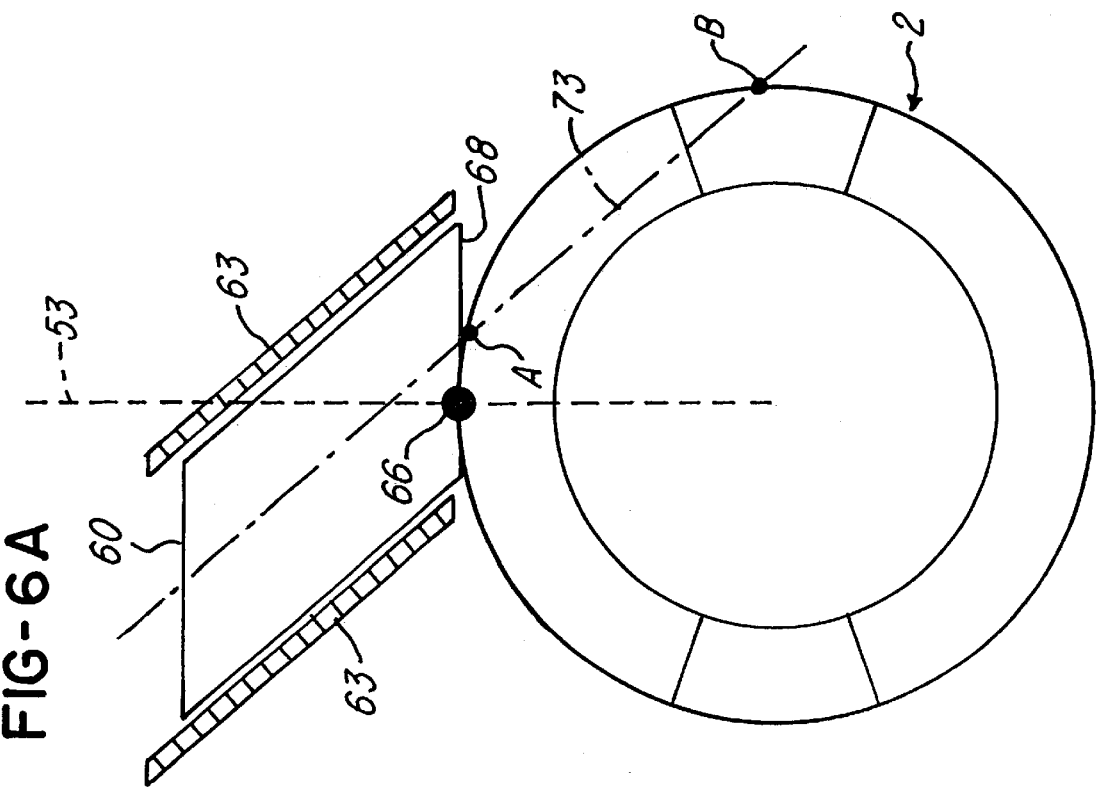

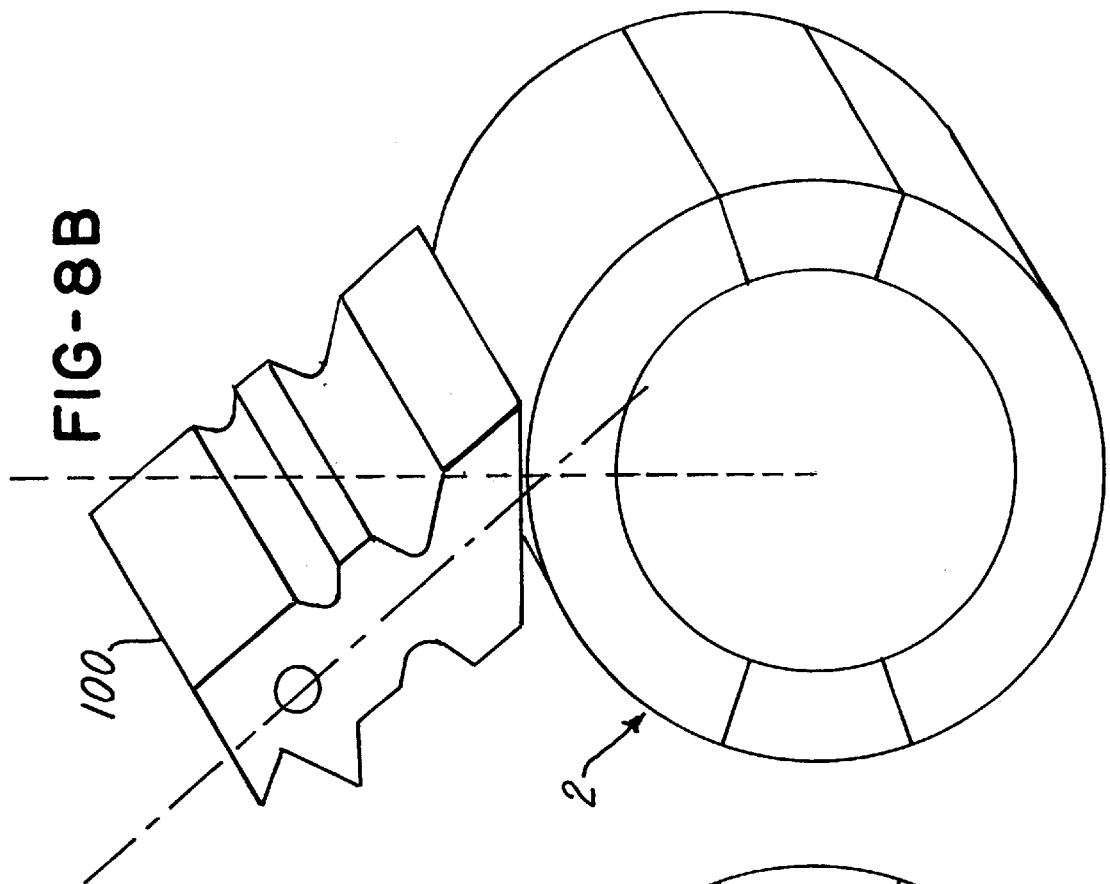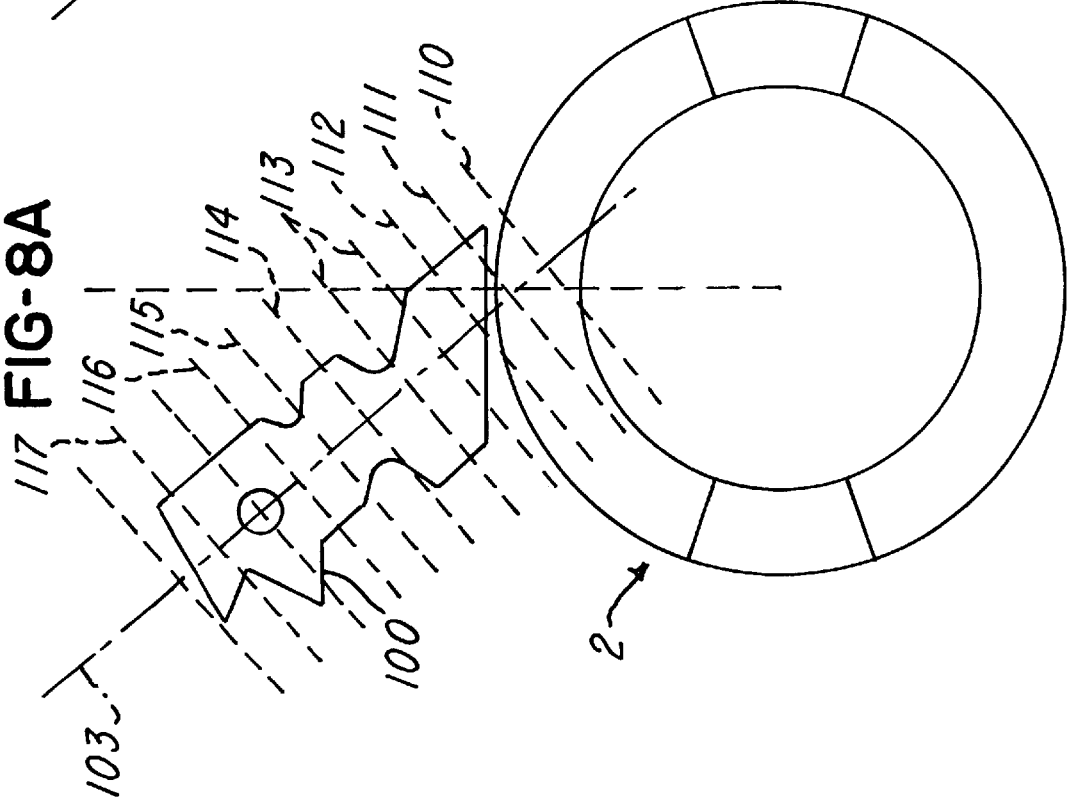

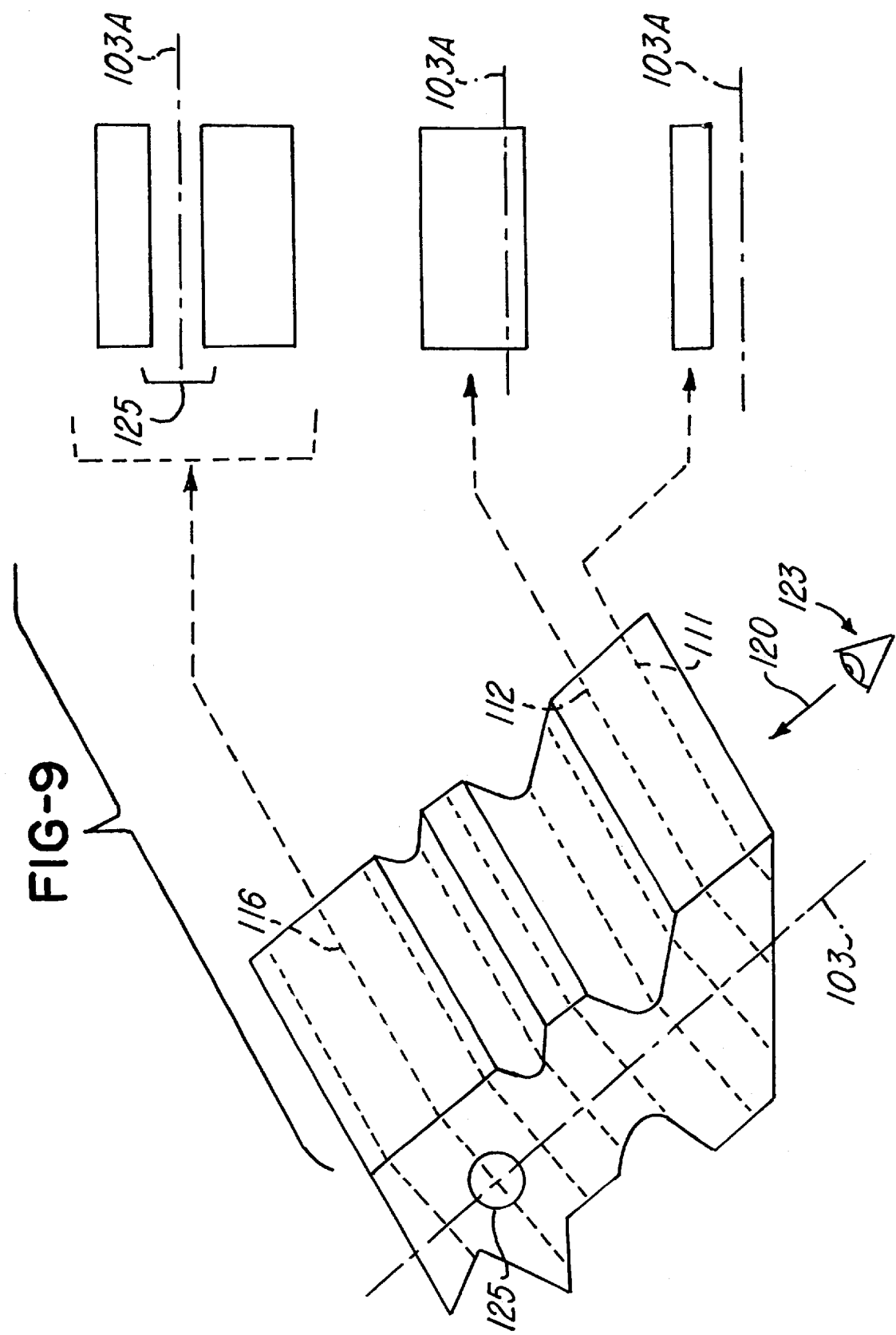

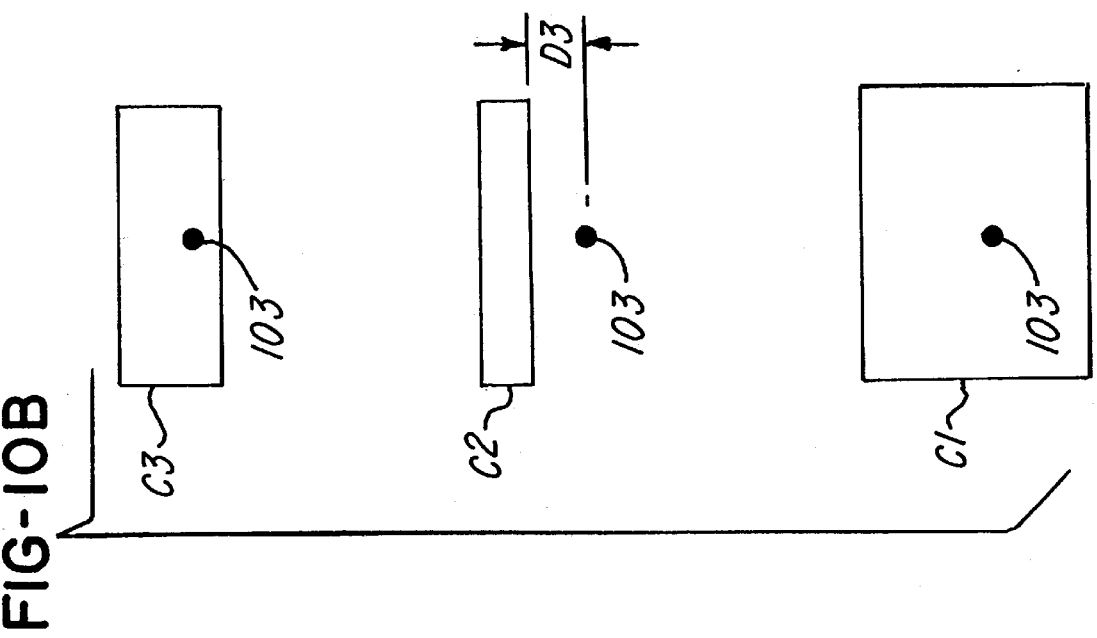
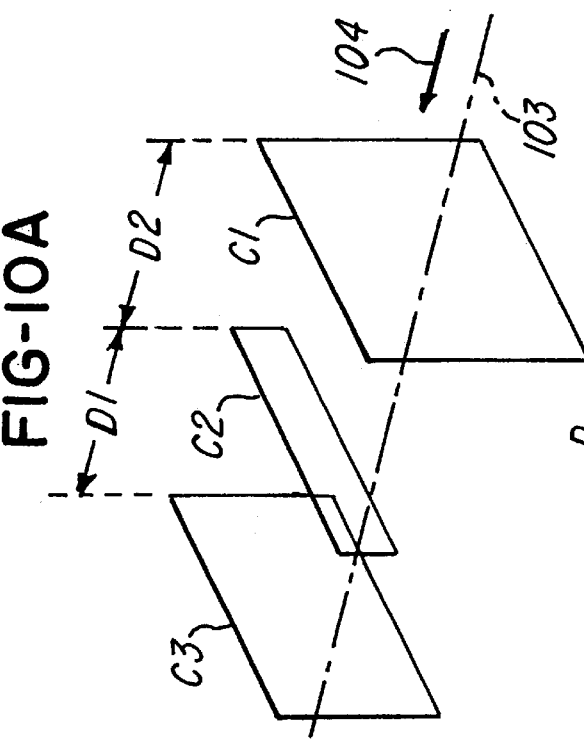
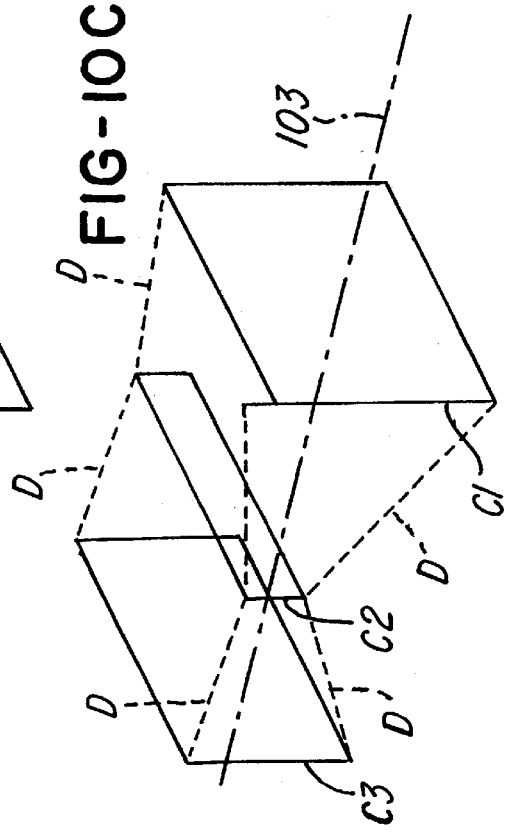

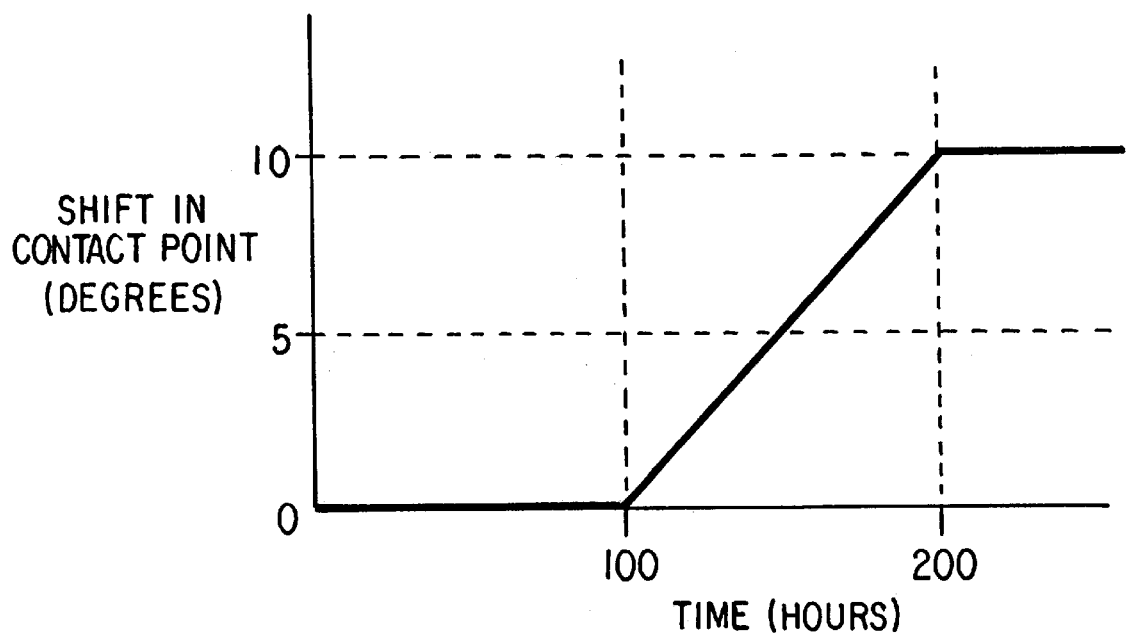
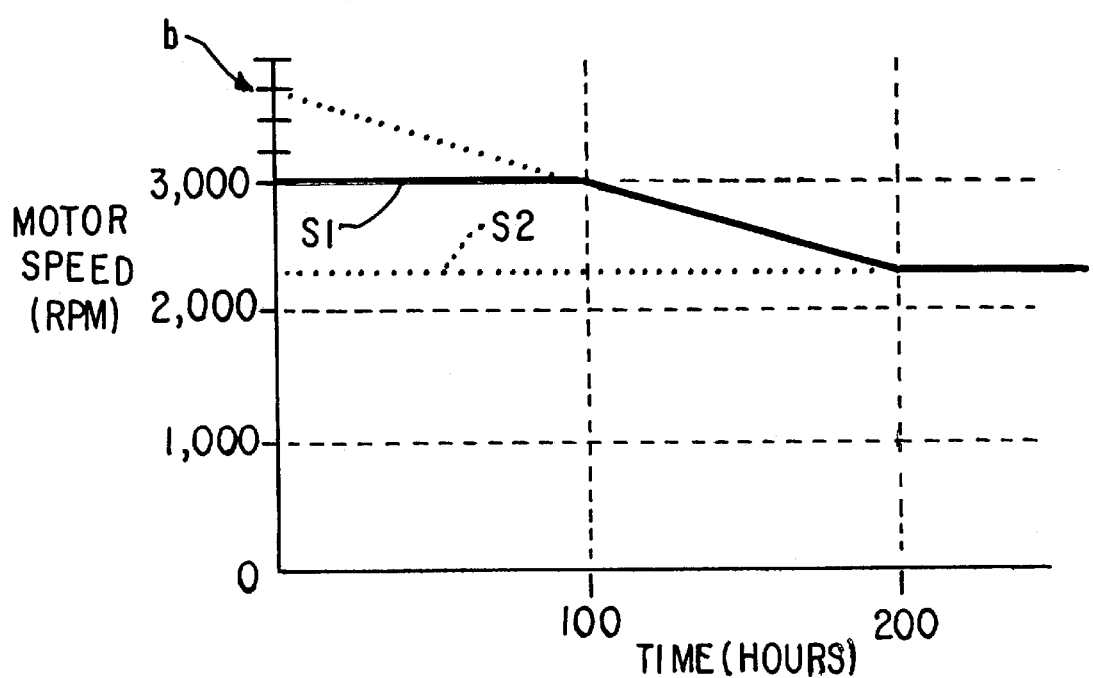

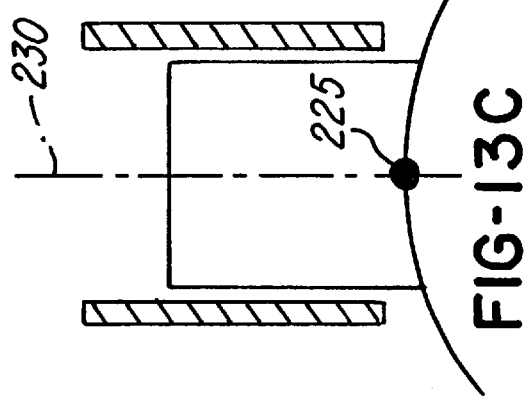
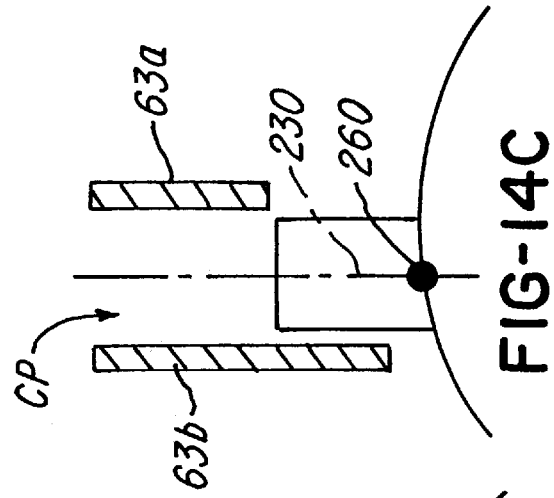
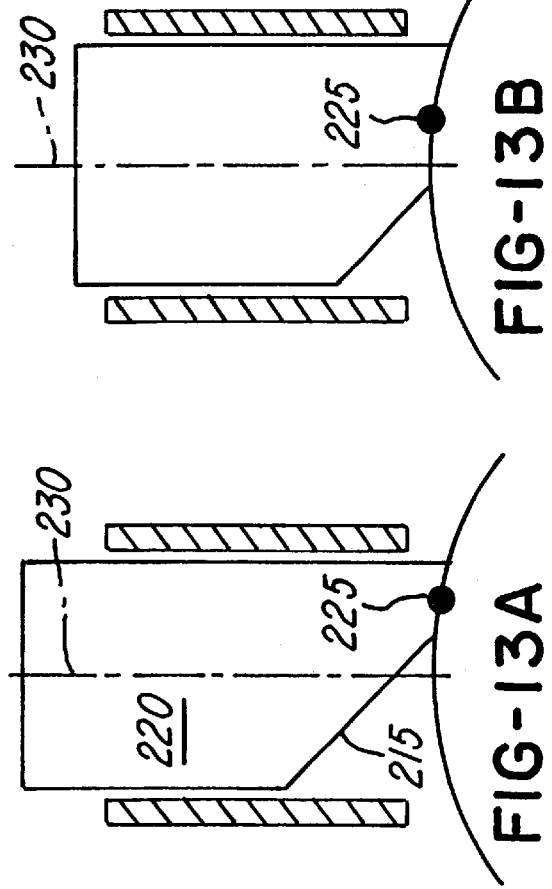
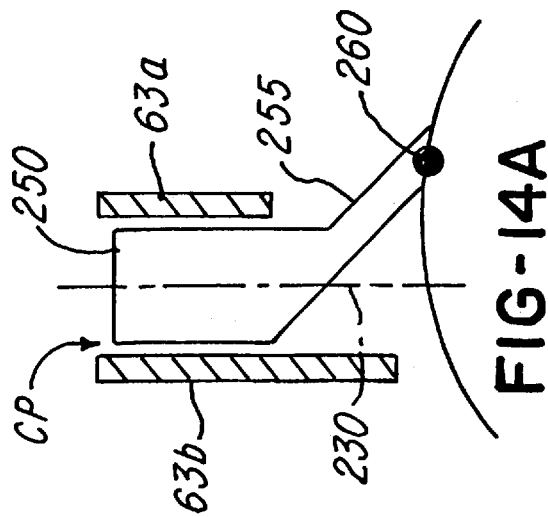

PROGRAMMABLE BRUSH FOR DC MOTORS

CROSS-REFERENCE TO RELATED APPLICATION

This application is a continuation-in-part of prior patent application Ser. No. 08/598,379, filed Feb. 8, 1996 now abandoned.

BACKGROUND OF THE INVENTION

1. Field of the Invention

The invention concerns brushes for commutated DC motors in which the contact between brush and commutator can be programmed to change position as the brush wears.

2. Description of Related Art

FIG. 1 illustrates a generalized commutator 2 in a simple DC machine. Commutator contact 3 (shown hatched) and contact 6 (not hatched) connect to leads 9 and 12 of a coil 15, respectively. Brushes 18 (of positive polarity, as indicated) and 21 (of negative polarity) deliver current to the contacts, and cause current 24 to flow in the coil 15.

When the commutator 2 is in the position shown in FIG. 1A, the current 24 flows in the direction shown, with respect to reference dot 27, which is considered fixed to the coil 15. When the commutator 2 rotates to the position shown in FIG. 1B, the current 24 reverses in direction, with respect to the dot 27 (although, of course, the current still flows from the positive brush 18 to the negative brush 21).

Therefore, rotation of the commutator 2 causes current within the coil 15 to reverse direction. This reversal causes reversal of the magnetic field lines 30 with respect to the coil 15, as indicated, which are generated by the current 24. Even though the magnetic field lines 30 point leftward in both FIGS. 1A and 1B, it should be remembered that, in FIG. 1B, the coil 15 is inverted, with respect to FIG. 1A. Consequently, the magnetic field lines 30 have become reversed, in FIG. 1B, with respect to the coil 15.

The magnetic field lines interact with a stationary magnetic field 30S, produced by a stator (not shown). Since the two magnetic fields 30 and 30S want to align with each other, they urge the coil to rotate, in order to allow the alignment. However, since the field lines 30 associated with the coil 15 continually reverse in direction, the coil 15 continually rotates in pursuit of this alignment. (If a non-changing, DC current flowed in the coil 15, the coil would stop rotating once the fields became aligned.)

FIG. 2 is an enlarged view of brush 18 of FIG. 1. As the brush 18 wears, and material is removed by the wear, a spring (not shown) causes the brush 18 to advance in the direction of arrow 19. The brush 18 advances along a reference line 33, drawn exactly at the 12 o'clock position. During this advancement, the center 36 of the region of contact remains fixed on reference line 33, as indicated in FIGS. 2B and 2C.

In a DC motor generally, changing the position of point 36 changes the speed, or torque, or both, produced by the motor. It can be desirable to change the position of point 36 during the lifetime of the motor, for various purposes.

One purpose is to compensate for changes in speed which are caused by wear. For example, when the brush configuration changes from that of FIG. 2A to FIG. 2B, the area of contact becomes larger, and the average time during which brush 18 shorts two or more adjacent commutator segments, and therefore two or more armature coils, increases. This change in contact area can change motor speed. It may be desirable to move point 36, in an attempt to counteract the change in motor speed.

SUMMARY OF THE INVENTION

An object of the invention is to provide an improved brush for a motor.

A further object of the invention is to provide a brush for a motor in which the center of contact changes in a predictable and desirable manner, as the brush wears.

A further object of the invention is to provide a method of designing a brush for a motor.

In one form of the invention, a motor brush is configured such that, as wear occurs, the contact region between the brush and commutator moves circumferentially along the commutator.

In another form of the invention, this invention comprises an electric motor having a commutator, an improvement consisting of a brush in contact with the commutator and means for changing contact angle of the brush, in response to brush wear.

In still another form of the invention, this invention comprises

An electric motor consisting of a commutator and brush means for contacting the commutator at a region which moves circumferentially along the commutator, as the brush wears.

In yet another form of the invention, the invention comprises a brush system for an electric motor, consisting of a support for holding a brush in contact with a commutator and means for changing circumferential position of the contact, as the brush shortens due to wear.

These and other objects and advantages of the invention will be apparent from the following description, the accompanying drawings and the appended claims.

BRIEF DESCRIPTION OF THE ACCOMPANYING DRAWINGS

FIGS. 1A and 1B illustrate a simple DC machine;

FIGS. 2A, 2B, and 2C illustrate wear-induced movement of brush 18 in FIG. 1A;

FIG. 3 illustrates one form of the invention;

FIGS. 4A and 4B illustrate circumferential movement of the center of contact 50, as brush 40 wears;

FIGS. 5A–5C illustrate another form of the invention;

FIGS. 6A and 6B illustrate yet another form of the invention;

Figure 1A:
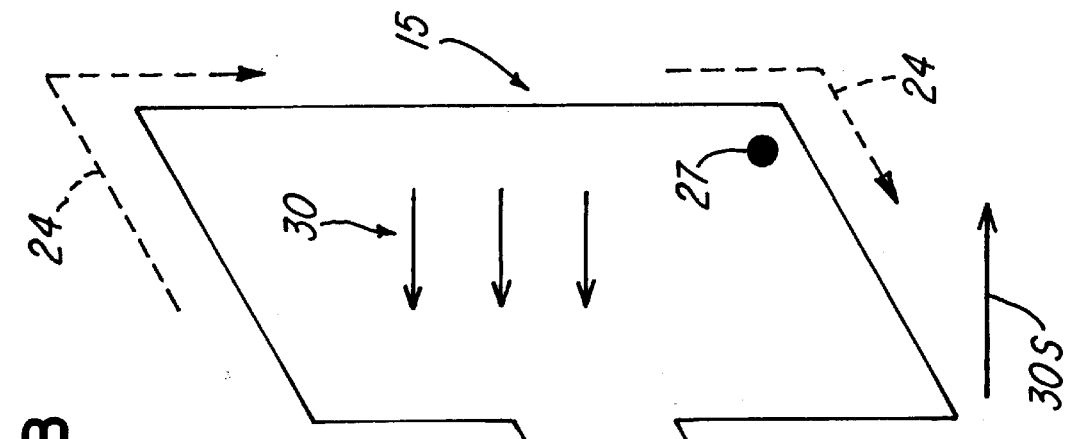
Figure 1B:
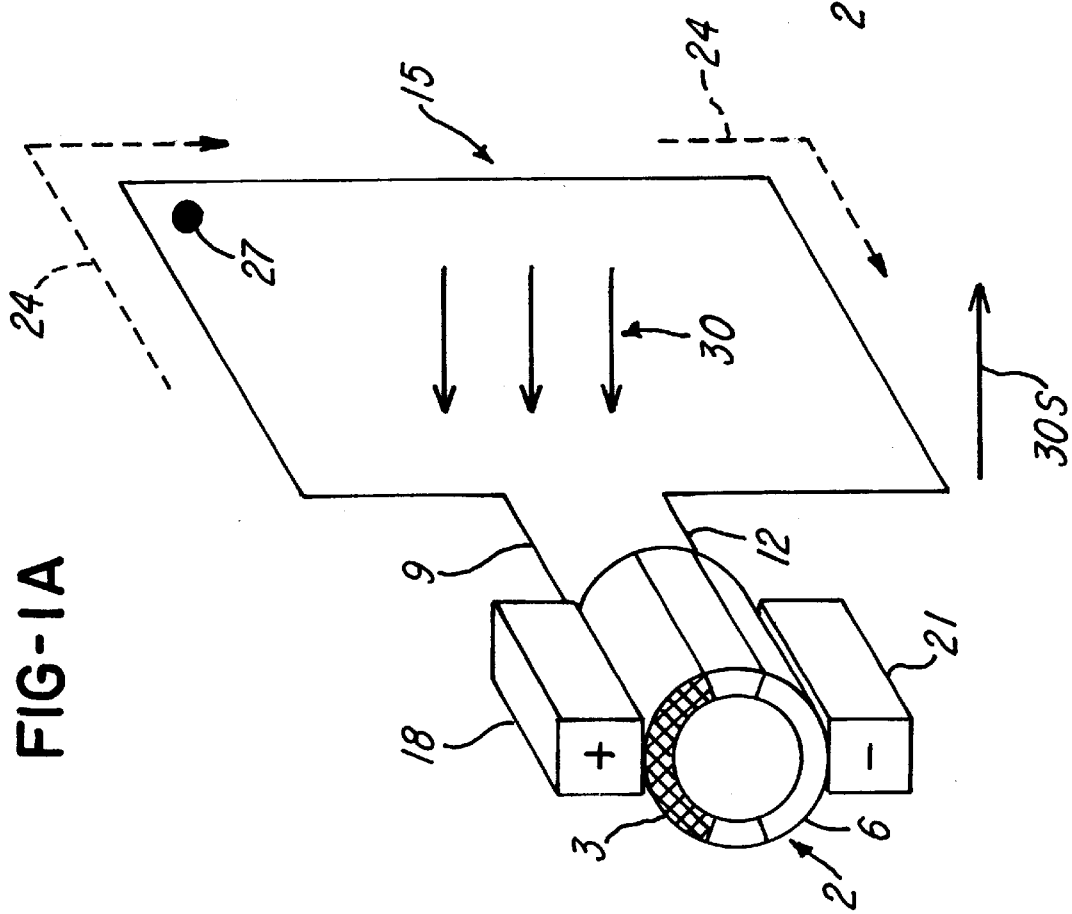
Figure 7C:
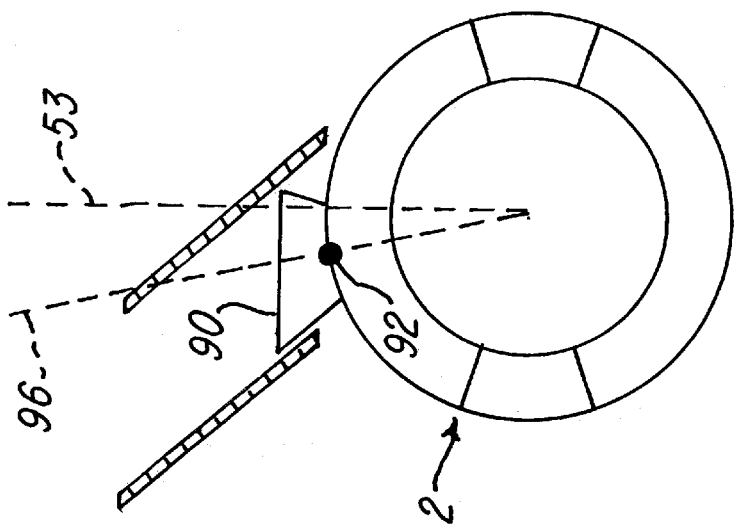
Figure 7B:
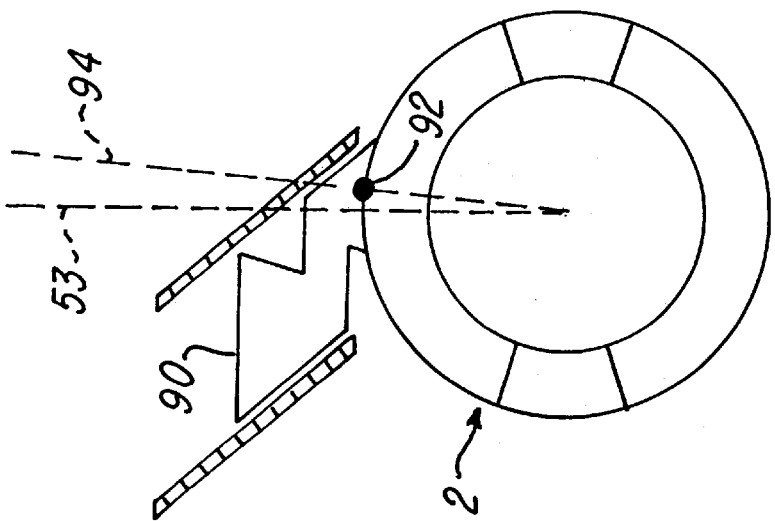
Figure 7A:
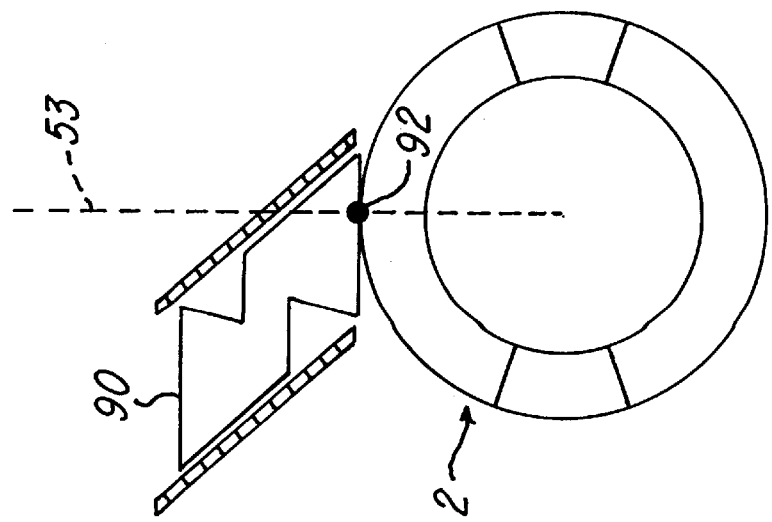

FIGS. 7A, 7B, and 7C illustrate still another form of the invention, showing initial clockwise motion of center point 92, followed by counter-clockwise motion.

Figure 11:
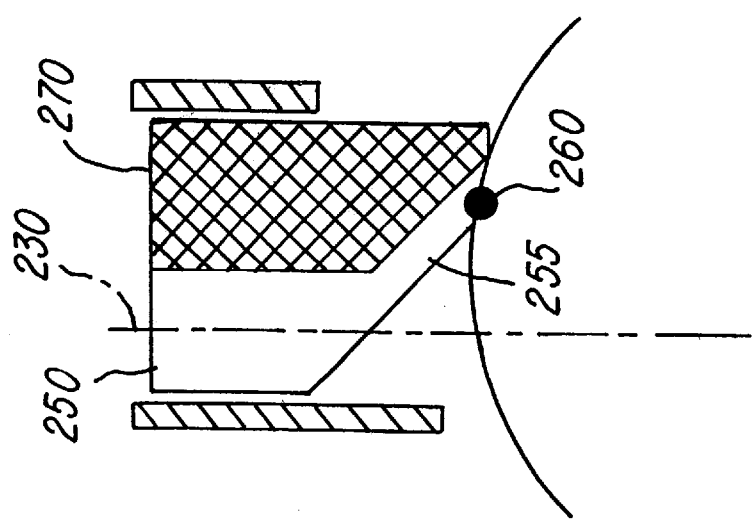

FIG. 8A illustrates a brush of arbitrary, generalized configuration;

FIG. 8B is a perspective view of the brush shown in FIG. 8A;

FIG. 9 illustrates shapes and relative locations of three cross-sections of the brush of FIG. 8;

FIGS. 10A, 10B, and 10C illustrate a sequence of steps in designing a brush;

FIG. 11 illustrates an automotive vehicle;

FIGS. 12A and 12B are exemplary plots illustrating how contact point angle should be programmed based on elapsed motor running time.

Figure 15:
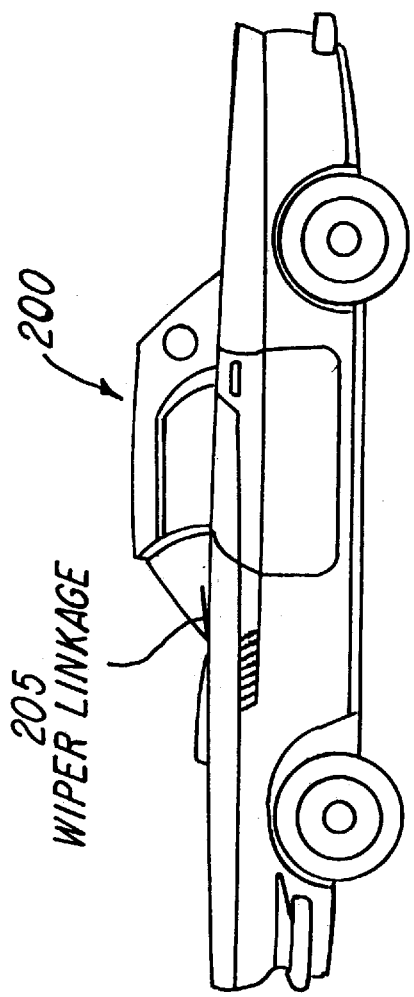

FIGS. 13A, 13B and 13C illustrate a sequence of events occurring in the wear of a brush;

FIGS. 14A, 14B and 14C illustrate a sequence of events occurring in the wear of a brush;

FIG. 15 illustrates a particular type of brush; and

Figure 16:
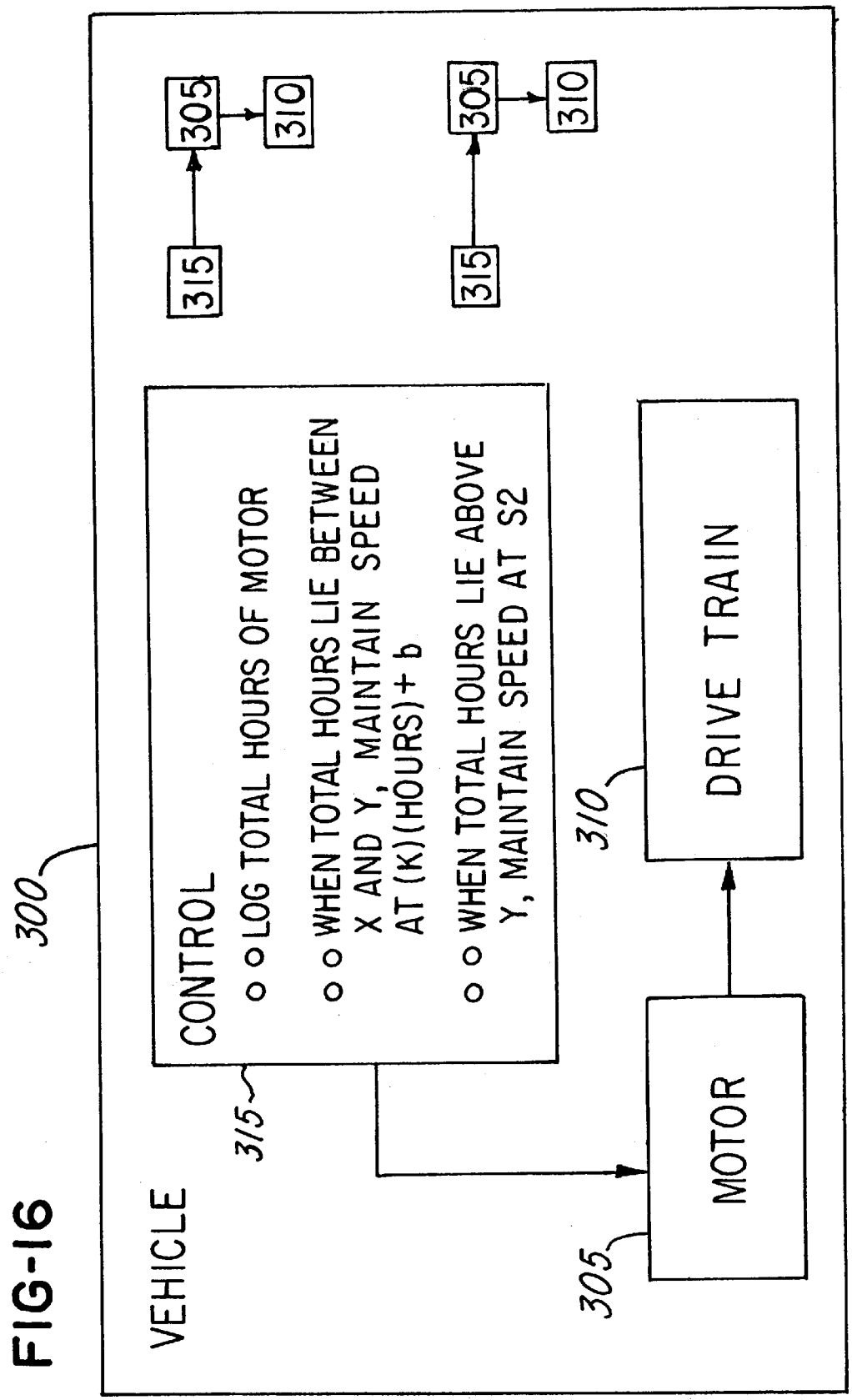

FIG. 16 illustrates one form of the invention.

DETAILED DESCRIPTION OF THE INVENTION

FIG. 3 illustrates one form of the invention, in which a guide bar, or rail, 42 is affixed to brush 40. The guide bar 42 slides in a slot 43 contained in a support 44 which is fixed in position, as indicated by ground symbol 46.

As the brush 40 wears, a spring 47 causes it to be biased or advanced towards the commutator 2, as indicated by FIGS. 4A and 4B. FIG. 4A shows brush position early in the wear cycle. Contact point 50 is located on a reference line 53, which is drawn at the 12 o'clock position. FIG. 4B shows brush position later in the wear cycle. The center point 50 of the contact region has advanced clockwise, as indicated by the angle A between lines 53 and 56. The point 50 no longer lies on the 12 o'clock line 53, but has moved circumferentially, by angle A.

In motor terminology, the angle of the central point of contact 50 is commonly called a "brush angle," or "contact angle." FIG. 4B shows such an angle A, with reference to the 12 o'clock position.

As an alternate to the embodiment of FIG. 3, the slot 43 can be fabricated in the brush 40, while the guide bar 42 can be held by the support 44.

FIGS. 5A–5C illustrate another embodiment of the invention, wherein brush 40A is constrained within a guide 41. As wear occurs, the central point 50 will first move clockwise, as in FIG. 5B, as indicated by line 56. As wear proceeds, the central point then moves counter-clockwise, as indicated by line 56A in FIG. 5C.

FIGS. 6A–6B illustrate another embodiment, wherein a brush 60 in FIG. 6A is carried by a guide 63. Initially, the center of contact 66 lies on reference line 53.

As the brush 60 wears, a cylindrical groove 67 in FIG. 6B becomes worn into the contact surface 68. The contact surface 68 in FIG. 6B becomes conformal to the cylindrical surface of the commutator 2 at the region of wear. As the groove 67 is formed, the center of contact 66 becomes displaced away from the reference line 53, as indicated by line 71.

One reason for the displacement is that the brush 60 is constrained, by guide 63, to move along axial line 73 in FIG. 6A. This axial line 73 does not coincide with the reference line 53, contrary to the case of FIG. 2A, wherein a corresponding axial line 75 does coincide with reference line 53. (In FIG. 2A, the axial line 75 is shown slightly removed from the reference line 33, in order to make both lines visible.) Also, the axial line 73 in FIG. 6A coincides with a chord of the commutator, which runs between points A and B.

Because the brush 60 moves along axis 73, which coincides with a chord, the brush has a radial component of motion, as well as a circumferential component.

From another point of view, because of the constraint on movement of the brush in FIG. 6B, as the cylindrical groove 67 becomes created, its endpoints 80 and 83 do not maintain symmetry about reference line 53. Consequently, the center of contact 66, which lies mid-way between these points, Will eventually move away from the reference line 53.

FIG. 7 illustrates another embodiment of the invention, in which two types of motion of point 92 occur, namely, clockwise and counter-clockwise. Initially, the brush 90 is positioned as shown in FIG. 7A. Contact point 92 lies on reference line 53. A time later, after some wear occurs, the brush advances to the position shown in FIG. 7B. Now, central point 92 has advanced to the right of the reference line 33, and lies on line 94. Yet later, after additional wear occurs, the central point 92 has retreated to the position shown in FIG. 7C, and lies on line 96. Central point 92 has first moved clockwise, and then counterclockwise.

FIGS. 5A–5C and 7A–7C illustrate a general feature of one form of the invention, namely, that the brush can be designed with different cross-sections, at different axial locations. As wear occurs, the different cross-sections become successively exposed, and change the location of center point 92 in FIGS. 7A–7C. The concept of using different cross-sections will be elaborated, with reference to FIGS. 8A–8B and 9.

FIG. 8A is a cross sectional view of a brush 100 having the preselected configuration shown, and FIG. 8B illustrates the brush 100 in perspective view.

In FIG. 8A, an axis 103 is defined within the brush 100. The brush is constrained to move along this axis, as by confining it within a guide such as guide 63 as in FIG. 6A. Different stations 110–117 in FIG. 8A are defined along the axis 103. For the cross-section at each station, the shape, size, and location with respect to the axis 103, is designed to provide the proper region of contact with the commutator.

For example, FIG. 9 illustrates three cross-sections, shown on the right of the figure, as they would appear if viewed along arrow 120, as indicated by eye 123. Also, axis 103, on the left, is indicated on the right as axial planes 103A, each associated with one of the three cross-sections.

The cross-section at station 111, shown at the right, is rectangular, and is. displaced from the axial plane 103A. The cross-section at station 112 is again rectangular, but larger in size, and intersects the axial plane 103A. The cross-section at station 116 is divided into two parts, because hole 125 intersects this station. The axial plane 103A intersects the hole, as indicated.

Therefore, in general, the invention contemplates a brush having different cross-sections at different axial stations. For example, notice the serpentine or "zig-zag" shape in FIGS. 7A–7C. As the brush wears, different cross-sections become exposed in sequence. The different cross-sections produce different central contact points, such as point 92 in FIGS. 7A–7C.

One method for design of the brush includes the following steps. First, the shape needed for each cross-section is determined, as well as the location with respect to axis 103 in FIG. 9. As an example of the shapes, FIG. 10A illustrates three hypothetical cross-sections C1, C2, and C3. FIG. 10B illustrates an example of location-with-respect-to-axis-103: cross-section C2 is displaced from axis 103 by distance D2, as indicated on the right. Other cross-sections have the positions shown, with respect to the axis 103.

The shape and location of each cross-section determine the center of contact generated by that cross-section. Point 92 in FIG. 7A illustrates one such center. Of course, the center of contact, in strict terms, is also determined by the cylindrical arc which is cut into the cross-section by the commutator. One example of such an arc lies in arc 67 in FIG. 6A.

Determination of the precise center of contact involves a straightforward geometric computation, based on the relevant parameters of the cross-section and the cylindrical arc. For example, for the cross-section at station 112 in FIG. 8A, one conceptually moves the cross section into contact with the commutator 2, and conceptually cuts an arc into the cross-section. The center of the arc represents the center of contact.

As the next step in the design process, the rate of wear of the brush is determined, which, in effect, determines distances D1 and D2 in FIG. 10A. That is, the geometric distances D1 and D2 are, in effect, also equivalent to durations of time, because, as time progresses, the brush wears down.

Finally, the outer edges of the cross-sections are connected, as indicated by the dashed lines D in FIG. 10C, producing the overall shape of the brush.

A brush for a motor has been described, which contacts a commutator, and in which radial motion, toward the center of the commutator, is induced by abrasion against the commutator. The wear removes material from the end of the brush.

As the material is removed, different cross-sections become exposed. The cross-sections can be different in shape, size, position, or any combination of these three characteristics. The different cross-sections will cause the center, or centroid, of electrical contact between the brush and the commutator to change.

FIG. 11 illustrates an automobile 200. Such automobiles contain motor-driven devices, such as windshield wipers, electrically driven windows, electrically adjustable seats, electrically collapsible roofs in convertibles, and the like.

These devices typically contain (1) an electric, brush-type, DC motor, (2) a drive train driven by the motor, such as the wiper linkage 205 in FIG. 11, or a gear train (not shown), and (3) the driven device, such as a windshield wiper, or seat. During the lifetime of the drive train, wear occurs in various components, causing lash or "play" of the drive train to increase.

This increase in play causes several problems. One is vibration. For example, if a bushing, within which a shaft rotates, becomes worn and enlarged, then the shaft is no longer securely captured by the bushing, and can vibrate. In general, an increase in vibration in any machine is not desirable.

Another problem is an undesired increase in component velocities. For example, assume that a lever within a linkage pivots about its center. If wear causes the pivot point to move away from the center, the one end of the lever may rotate faster, and the other end rotates slower. These changes in velocity are not desired. Further, the change in position of the pivot point will probably introduce eccentricity into the system, further increasing vibration and/or cause components (e.g., wiper arms) that are attached to the system to make undesirable contact with other vehicle components (e.g., the metal encasement "A-Pillar") of the windshield.

To combat these problems, the Inventor proposes that the motor driving the train be programmed to decrease in speed as the drive train increases in age. FIG. 12A illustrated one type of programming. During the initial period of the motor's life, until the motor reaches 100 hours of age in this example, the speed is held constant at, 3,000 rpm in this example. In the middle period of the motor's life, between 100 and 200 hours of age in this example, the speed is progressively decreased to about 2,000 rpm. Then, in the final parts of the motor's life, after 200 hours in this example, motor speed is held constant at about 2,200 rpm.

The top part of FIG. 12 illustrates one approach to attaining these programmed changes in speed. The brush contact angle, discussed above, is held at zero degrees until 100 hours of life is reached. At that time, the contact angle progressively advances toward ten degrees, as lifetime progresses toward 200 hours. Then, at 200 hours, the contact angle is held constant.

FIG. 13 illustrates one apparatus for attaining this advancement of contact angle. In FIG. 13A, the face 215 of brush 220 is positioned so that the contact point 225 progressively moves toward the 12 o'clock position 230, as wear occurs, as indicated in the sequence of FIGS. 13A, 13B and 13C.

FIG. 14 illustrates another apparatus. Brush 250 contains an extension 255. The contact point 260 progressively moves toward the 12 o'clock position 230, as wear occurs, as indicated in the sequence of FIGS. 14A, 14B and 14C. The extension 255 may be mechanically weak. FIG. 15 illustrates a non-conductive backing 270, which is fastened to the brush 250. As the wear of FIG. 14 occurs, the non-conductive backing 270 also wears, and makes contact with the rotor R, but has no effect on the position of the contact point 260.

It should be appreciated that the contact point 260 shown in FIG. 14A lies outside the area CP defined by boundaries dictated by the guides 63a and 63b. As the brush 250 wears, the contact point 260 moves counter-clockwise (as shown in FIGS. 14A–14C) such that the point 260 moves within the area CP as best illustrated in FIG. 14C. Conversely, it should be appreciated that a brush could be provided such that the contact point moves from within the area defined by the boundaries of the guides to outside the area.

FIG. 16 illustrates another approach to modulating motor speed, based on total elapsed running time of the motor. A vehicle 300 contains an electric motor 305 which drives a drive train 310. A control 315 performs the functions indicated.

The control logs the total hours of the motor. Timers, known in the art, are available to log the total time of the motor. It is emphasized that the total running time of the motor will, in general, be different than the total running time of the vehicle itself. In principle, the brushed of FIGS. 13 and 14 provide an index as to the total running time: brush wear in correlated with total running time.

As control 315 further indicates, when motor speed lies between X and Y, speed is maintained such that speed=(K)(HOURS)=b. This equation is of the familiar form y=mx=b, wherein x and y are cartesian coordinates, m is the slope, and b is the y-intercept. FIG. 12A indicates that b equals about 3,750 rpm. The slope will equal (S1−S2)/(100−200), or about (3,000 −2,200)/(−100), which equals negative 8.

Thus, for the example of FIG. 12A, when total elapsed time is between 100 and 200 hours, the control 315 in FIG. 16 maintains speed according to this equation:

$$\text{speed}-(-8)(\text{hours})=3,750.$$

As a specific example, when total elapsed time is 150 hours, the equation just given indicates that speed will be held at (−8)(150)=3750, or 2,550 rpm.

In control 315, when total time exceeds Y, which is 200 hours in FIG. 12A, speed is held at S2, which is 2,200 rpm in FIG. 12A. As FIG. 16 indicates, the triplet of motor 305, drive train 310, and control 315 can occur multiple times within the vehicle. For example, one triplet can run windshield wipers, another can run an adjustable seat, and so on. The overall control 315 in some, or all, of these can comprise the brush system described above.

Numerous substitutions and modifications can be undertaken without departing from the true spirit and scope of the invention. What is desired to be secured by Letters Patent is the invention as defined in the following claims.

I claim:

1. In an automotive vehicle, the improvement comprising:
    a) a drive train in which wear causes play to arise;
    b) a motor for driving the drive train, and having a lifetime which is definable into three periods: initial, middle, and final;
    c) brush means for delivering current to a rotor of the motor, and which causes motor speed to
        i) remain substantially constant during the initial period;
        ii) progressively decrease during the middle period; and
        iii) remain substantially constant during the final period.

2. Apparatus according to claim 4, wherein the drive train drives a windshield wiper.

3. Apparatus according to claim 1, wherein the drive train moves a seat within the vehicle.

4. In an automotive vehicle, the improvement comprising:
    a) a drive train in which wear causes play to arise;
    b) a motor for driving the drive train;
    c) brush means for delivering current to a rotor of the motor, and which causes motor speed to
        i) remain substantially constant during approximately the first 100 hours of operation; and
        ii) progressively decrease during approximately the next 100 hours of operation.

5. Improvement according to claim 4, in which the brush means causes motor speed to remain substantially constant after approximately 200 hours of operation.

6. Apparatus according to claim 6, wherein the drive train drives a windshield wiper.

7. Apparatus according to claim 4, wherein the drive train moves a seat within the vehicle.

\* \* \* \* \*